United States Patent [19]

Ernstson et al.

[11] Patent Number: 4,606,827

[45] Date of Patent: Aug. 19, 1986

[54] METHOD FOR SEPARATING AND RECOVERING COLOR DEVELOPING AGENT

[75] Inventors: Christer Ernstson, Linköping, Sweden; Yousuke Sadahiro, Sagamihara, Japan

[73] Assignee: Konishiroku Photo Industry Co., Ltd., Japan

[21] Appl. No.: 616,170

[22] Filed: Jun. 1, 1984

[30] Foreign Application Priority Data

Jun. 3, 1983 [JP] Japan ................................ 58-99275
Jul. 30, 1983 [JP] Japan ................................ 58-140425

[51] Int. Cl.[4] .............................................. B01D 15/04

[52] U.S. Cl. .................................... 210/670; 210/692; 430/399

[58] Field of Search ............... 210/670, 674, 677, 681, 210/692, 917; 430/399

[56] References Cited

U.S. PATENT DOCUMENTS

| | | | |
|---|---|---|---|
| 3,869,383 | 3/1975 | Shimamura et al. | 210/670 |
| 3,931,004 | 1/1976 | Shimamura et al. | 210/670 |
| 4,043,907 | 8/1977 | Shimamura et al. | 210/670 |
| 4,159,245 | 6/1979 | Matsushita et al. | 210/649 |

*Primary Examiner*—Ivars Cintins
*Attorney, Agent, or Firm*—Finnegan, Henderson, Farabow, Garrett & Dunner

[57] ABSTRACT

A method and apparatus for separating and recovering a color developing solution from a color photographic processing solution with the aid of a cation exchange resin are disclosed. Said solution has a pH of not higher than 8.0 and is brought into contact with a cation exchange resin, which is in turn brought into contact with an alkali solution having a pH of not lower than 9.0.

2 Claims, 2 Drawing Figures

METHOD FOR SEPARATING AND RECOVERING COLOR DEVELOPING AGENT

FIELD OF THE INVENTION

The present invention relates to a method for selectively separating and recovering a color developing agent from a color photographic processing solution. More particularly, the invention relates to a method for selectively separating and recovering a color developing agent from a color photographic processing solution with the aid of a cation exchange resin.

BACKGROUND OF THE INVENTION

Color developing solutions used to form dye images on silver halide color photographic materials generally contain p-phenylenediamine color developing agents, alkali agents such as sodium hydroxide, sodium carbonate, trisodium phosphate, sodium metaborate and borax, antioxidants such as sodium sulfite and hydroxylamine salts, and development restrainers such as potassium bromide, potassium iodide and 6-nitrobenzimidazole nitrates. If necessary, other components may be contained to achieve special purposes; for example, a color development accelerator such as benzyl alcohol may be used for the purpose of facilitating the penetration of the oxidation product of the color developing agent into oil globules that contain a coupler and are dispersed in an emulsion layer, thereby promoting the desired color formation through the binding with the coupler.

The developing power of the developing solution decreases as silver halide color photographic materials are processed in large amounts and as the oxidation of the developing solution proceeds during storage. Such exhausted developing solution must be replaced partially or entirely so as to maintain the desired range of developing power. Replacement is also made of subsequent processing solutions such as stopping bath, fixing bath, bleaching bath, blix bath and stabilizing bath for the purpose of maintaining their performance. However, part of the developing solution on the photographic material is carried over into the subsequent processing solutions and discarded when the latter are disposed of for replacement. As a result, the waste color developer and other photographic processing solutions contain various additives such as p-phenylenediamine developing agent in fairly high concentrations. In particular, the p-phynylenediamine developing agent has BOD (biochemical oxygen demand) and COD (chemical oxygen demand) higher than the values tolerated by antipollution laws such as the Water Pollution Prevention Act and Sewerage Law, and may cause environmental pollutions if it is discharged directly into sewerage and other watercourses.

In order to avoid this problem, the photographic processing solutions containing the p-phenylenediamine developing agent must be discharged into sewerage and other watercourses after the developing agent and other pollutants are separated or recovered from the processing solutions or otherwise rendered harmless. It is therefore necessary to develop techniques effective for achieving this purpose. On the other hand, the p-phenylenediamine developing agent is expensive and discarding the separated and recovered p-phenylenediamine is not desired for economical reasons. It is therefore advisable to put the separated and recovered p-phenylenediamine compound to another use as a color developing agent.

Various methods have been proposed for separating the color developing agent from photographic processing solutions discharged from such steps as color development, fixing, bleaching and stabilizing. U.S. Pat. No. 3,884,983 shows a method of separating and removing a certain compound from a processing solution by contact with activated carbon. U.S. Pat. No. 2,358,053 shows a method of extraction with an organic solvent such as kerosene. Japanese Patent Publication No. 33698/73 shows a method of separating and recovering the developing agent and other components by salting-out the developing solution with a salt such as sodium sulfate. U.S. Pat. No. 3,253,920 proposes a method of recovering the developing agent dissociated with the aid of an anion exchange resin. Japanese Patent Application (OPI) No. 82235/77 (the symbol OPI as used herein means an unexamined published Japanese patent application) shows a method of separation and recovery using a styrene-divinylbenzene copolymer. Japanese Patent Application (OPI) No. 50737/78 shows a method of separating the developing agent and other components from a photographic processing solution by contact with a methacrylate polymer.

However, these methods have various defects from a practical viewpoint. The first method using activated carbon features ease of operation and high ability to separate organic matters from the aqueous solution. However, selective adsorption of a certain organic matter is not possible. Furthermore, the activated carbon has such a strong adsorbing power that the organic matter cannot be easily desorbed from the carbon and requires complex and expensive separation and purification procedures. The second method that depends on extraction with an organic solvent uses a large quantity of inflammable organic solvent which is not only toxic but also presents a great fire hazard. Furthermore, these solvents are expensive. The third method requires a large amount of salt and is not highly recommendable from an economical viewpoint. In addition, this method salts out all compounds that are hardly soluble, so a complex procedure is necessary for purifying the developing agent and other compounds separated from the salt solution. The fourth method is also not highly practical because the anion exchange resin is very low in its efficiency of removing the p-phenylenediamine developing agent having a low degree of dissociation. The fifth method that uses a styrene-divinylbenzene copolymer and the sixth method using a methacrylate polymer to adsorb a certain compound in the photographic processing solution experience a gradual decrease with time in their ability to remove the certain compound. Furthermore, a large amount of strong acid is used to regenerate the resin adsorber or an organic solvent such as methanol must be used for desorption purposes. However, the use of strong acids and organic solvents is not recommended for safety reasons.

In addition to these individual problems, the prior art methods have one common defect: Recycling of the separated and recovered photographically valuable compound, in particular, p-phenylenediamine color developing agent, requires a complex process involving concentration, crystallization, precipitation and filtration or extraction with an organic solvent, and this is practically beyond the ability of commercial laboratories.

SUMMARY OF THE INVENTION

Therefore, a first object of the present invention is to provide a simple method of selectively separating a p-phenylenediamine color developing agent from a solution.

A second object of the present invention is to provide a method of using a cation exchange resin that is capable of highly selective separation and recovery of a p-phenylenediamine color developing agent from a solution and which permits easy elution of the separated and recovered developing agent and yet which can be used continuously over an extended period.

A third object of the present invention is to provide a method of recovering the selectively adsorbed p-phenylenediamine color developing agent from the cation exchange resin by simple separation and elution procedures, said method permitting another use of the recovered developing agent in the color developer.

A fourth object of the present invention is to provide a very simple apparatus capable of selective recovery of a p-phenylenediamine color developing agent from a waste photographic processing solution.

A fifth object of the present invention is to provide an apparatus which permits the p-phenylenediamine color developing agent to be desorbed or eluted from the cation exchange resin by a very simple procedure and which is capable of recycling the desorbed developing agent as a component of the color developer.

The first object of the present invention can be achieved by a method of separating a color developing agent from a solution at a pH of not higher than 8.0 by bringing said solution into contact with a cation exchange resin.

The second and third objects of the present invention can be achieved by a method of recovering a color developing agent from a solution at a pH of not higher than 8.0 by first bringing said solution into contact with a cation exchange resin and then bringing said cation exchange resin into contact with an alkali solution having a pH of not lower than 9.0.

The fourth object of the present invention can be achieved by an apparatus which comprises a tank for accommodating various waste photographic processing solutions containing a p-phenylenediamine color developing agent and which is capable of pH and salt concentration adjustments, and a column for a cation exchange resin with which the waste photographic processing solution is brought into contact for separating the p-phenylenediamine color developing agent.

The fifth object of the present invention is achieved by an apparatus which includes, in addition to the above-mentioned tank and resin column a tank for accommodating an alkali solution having a pH of not lower than 9.0 which is supplied to the resin column to desorb or elute the p-phenylenediamine color developing agent from the cation exchange resin and a recovery tank for receiving the alkali solution that has been passed through the resin column.

DETAILED DESCRIPTION OF THE PREFERRED EMBODIMENTS

Figure 1:
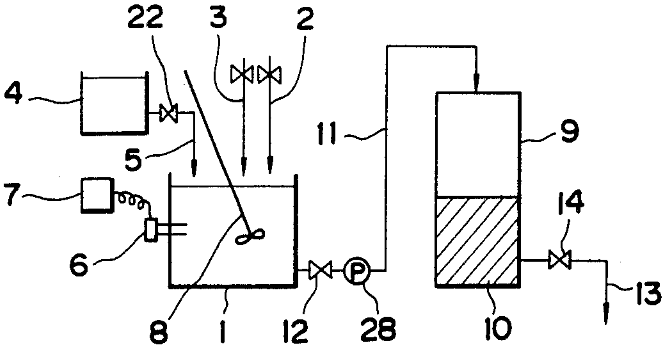
FIG. 1 is a schematic presentation of one embodiment of the apparatus of the present invention used to separate the p-phenylenediamine color developing agent from a waste photographic processing solution.

As a result of various studies made to achieve these objects, the present inventors have found that a p-phenylenediamine color developing agent can be selectively separated and recovered from a photographic processing solution at a pH of not higher than 8.0 by bringing this solution into contact with a cation exchange resin.

Examples of the cation exchange resin that can be used advantageously in the present invention include those which have functional groups such as sulfonic acid group and phosphonic acid group bonded to the resin matrix. Monofunctional resins which have only one kind of functional group bonded to the resin matrix as well as bifunctional and polyfunctional resins having two or more kinds of functional groups bonded to the resin matrix may be used. Preferred ion exchange resin matrixes to which these functional groups are bonded are copolymers of styrene and divinylbenzene. Other preferred examples include copolymers of acrylic acid or methacrylic acid and divinylbenzene to which a carboxylic acid group is bonded, phenol-formalin condensates having a methylenesulfonic acid group bonded thereto, and styrene-divinylbenzene copolymers having a sulfonic acid group, phosphonic acid group or iminodiacetic acid group as a functional group.

The chemical and physical properties of the cation exchange resin such as the exchange capacity, exchange rate, regeneration efficiency and the mechanical strength depend on the type of the functional group used and the content of a crosslinking agent incorporated in the resin matrix, namely, the degree of crosslinking. The cation exchange resin may be of gel type comprising colorless and transparent spherical particles of a generally homogeneous polymeric phase or of porous type comprising generally turbid spherical particles which are porous and present a very large surface area. A suitable type may be used depending upon the kind of the photographic processing solution from which the color developing agent is to be separated. If the developing agent is a p-phenylenediamine compound, the porous cation exchange resin is preferably used. More specifically, porous cation exchange resins having a total void content of 0.1 to 3 ml/g and a specific surface area of about 1 to 2000 $m^2/g$ are particularly preferred. Commercial products meeting these requirements include Amberlite IR-120, -116, -118, IRC-50 and -718 available from Rohm and Haas Company; Duolite C-20, -250, -26, -3 and ES-63 available from Diamond Shamrock Corporation; as well as Diaion SK 102, PK 208, WK 10, WK 20 and CR 10 manufactured by Mitsubishi Chemical Industries Limited. Other cation exchange resins may of course be used in the present invention.

Examples of the p-phenylenediamine color developing agent that can be selectively separated and recovered from a solution by the cation exchange resin according to the present invention include 3-methyl-4-amino-N-ethyl-N-β-hydroxyethylaniline, 3-methyl-4-amino-N-ethyl-β-methane-sulfonamidoethylaniline, 4-amino-N,N-diethylaniline, N-ethyl-N-β-(β-methoxyethoxy) ethyl-3-methyl-4-aminoaniline, and salts thereof such as sulfates, hydrochlorides and p-toluene-sulfonates.

In color photography, these developing agents are incorporated in a concentration of 0.1 to about 30 g, preferably 0.3 to about 15 g, per 1,000 ml of the color developing solution. These color developing agents may be used either alone or in admixture.

In addition to the color developing agents listed above, the color developing solution to be treated by the method of the present invention may contain various additives for color development such as alkali agents (e.g. sodium hydroxide, potassium hydroxide, sodium carbonate, potassium carbonate and borax); benzyl alcohol; alkali metal halides (e.g. potassium bromide and potassium chloride); development modifiers (e.g. citrazinic acid); and preservatives (e.g. hydroxylamine and sulfites).

The p-phenylenediamine color developing agent to be selectively separated and recovered by the present invention may be contained not only in the color developer but also in subsequent processing solutions such as bleaching bath, water rinsing bath, fixing bath, blix bath and stabilizing bath as a result of carryover by the film being processed. Therefore, the photographic processing solutions that are to be treated by the cation exchange resin according to the present invention include not only the color developer but also all processing solutions that are employed in the bleaching and fixing steps, as well as in any auxiliary steps of the processing of silver halide color photographic materials.

The p-phenylenediamine color developing agent may be separated and recovered from the photographic processing solution in any embodiment so long as the solution is held in contact with the cation exchange resin. For example, the cation exchange resin may be placed within the specific photographic processing solution such as the color developing bath, bleaching bath, fixing bath, rinsing bath or stabilizing bath. Alternatively, the cation exchange resin may be positioned in one or more vessels for collecting the photographic processing solution overflowing these baths. The treatment with the cation exchange resin may be performed either batchwise or in a continuous manner.

The photographic processing solution containing the p-phenylenediamine color developing agent may be brought into contact with the cation exchange resin by any known method that is conventionally used to treat wastewaters with cation exchange resins on an industrial scale. The simplest and most efficient method is of column type wherein the photographic processing solution containing the p-phenylenediamine color developing agent is passed either downwardly or upwardly through the cation exchange resin in a cylindrical vessel. Aside from this fixed bed type treatment, the fluidized bed type causing continuous fluidization of the cation exchange resin or the moving bed type causing continuous movement of the resin is particularly suitable for a large-scale treatment. When the fluidized bed is used, the cation exchange resin is preferably charged into the column overhead in a manner countercurrent with an ascending flow of the photographic processing solution charged from below the column. If the moving bed is used, it may ascend or descend through the column. There is no limitation on the number of columns to be used. The treatment (separation of the color developing agent), regeneration (elution) and washing may be performed within one and the same resin column. Alternatively, the respective steps may be carried out in a plurality of columns.

The method of the present invention may be applied to any of the processing solutions that contain color developing agents for silver halide color photographic materials such as color negative film, color paper, color positive film, color reversal film for use with projectors, color reversal film for motion pictures, color reversal film for TV and reversal color paper.

In order to selectively separate and recover the p-phenylenediamine color developing agent from the photographic processing solution by contact with the cation exchange resin, the processing solution must have a pH of not higher than 8.0. Therefore, a photographic processing solution having a pH of 10.0 or more must be adjusted to a pH of 8.0 or lower before it is brought into contact with the cation exchange resin for the purpose of selective separation and recovery of the color developing agent. Generally, stopping baths and fixing baths have a pH of not higher than 8.0, so they may be immediately brought into contact with the cation exchange resin for separation and recovery of the p-phenylenediamine color developing agent. If necessary, they may be adjusted to optimum values of pH. The optimum pH varies with the type and concentration of the color developing agent in the processing solution, the salt concentration, and the type of the functional group bonded to the cation exchange resin matrix. For the purposes of the present invention, the processing solution is generally adjusted to a pH in the range of 1 to 8, preferably between 1 and 5. For efficient separation and recovery of the p-phenylenediamine color developing agent, the salt concentration is generally not more than 0.3 mol, preferably not more than 0.2 mol, and particularly preferably not more than 0.05 mol, per liter.

Preferred acids that can be used to adjust the pH of the photographic processing solution to 8.0 or lower include sulfuric acid, hydrochloric acid and acetic acid, but various other acids conventionally used in photographic processing may also be used. These acids may be used either alone or in admixture.

The p-phenylenediamine color developing agent selectively adsorbed onto the cation exchange resin can be easily desorbed by elution with an alkali solution having a pH of 9 or more. The desorbed p-phenylenediamine compound is recovered and put to another service as a component of the color developing solution. Caustic alkalis, potassium carbonate, sodium carbonate and any other alkali agents commonly employed in photography may be used to desorb the p-phenylenediamine color developing agent from the cation exchange resin. Other suitable alkali agents include borates and phosphates. Alkali carbonates are preferred for ease of handling, low price and non-polluting nature.

The alkali solution containing the desorbed p-phenylenediamine color developing agent may be used in combination with one or more preservatives known in photographic art such as sodium sulfite, potassium bisulfite, sodium hydrogensulfite, hydroxylamine salts and hydroxylamine derivatives. This is for the purpose of preventing the oxidation and decomposition of the p-phenylenediamine developing agent.

In the best mode of embodiment, an overflow of the color developing solution is used as the alkali solution for desorbing the p-phenylenediamine color developing agent from the cation exchange resin. The overflowing color developer may be used as the alkali solution either immediately or after removing bromide ions and other unwanted components by passage through an anion exchange resin or electrodialysis. In whichever case, the concentration and pH of the overflowing color developer must be adjusted to predetermined values before it is put to another use.

According to the method of the present invention, the p-phenylenediamine color developing agent in the photographic processing solution can be selectively separated by the cation exchange resin in preference to other cations (e.g. $Na^+$ and $K^+$) in the processing solution. Furthermore, the p-phenylenediamine color developing agent can be readily desorbed by an alkali agent and put to another use as a component of the color developer. Conventionally, the p-phenylenediamine color developing agent is separated by salting-out, extraction or adsorption on an anion exchange resin and it is recovered in the form of either a strong acidic solution such as sulfuric acid or hydrochloric acid or a dilution in a large quantity of organic solvent. However, according to the method of the present invention, the p-phenylenediamine color developing agent can be easily separated from the photographic processing solution and can be readily converted to a reusable form without any complicated chemical treatment. Therefore, the method of the present invention can be employed even at commercial laboratories and hence features a great commercial value.

The foregoing description concerns the preferred embodiments of the present invention wherein it is applied to selective separation and recovery of the color developing agent from solutions commonly employed in the steps of processing of silver halide color photographic materials such as color development, bleaching, fixing, bleach-fixing, stabilization, stopping and water rinsing. However, it should be understood that the applicability of the method of the present invention is extended to any of the solutions containing the p-phenylenediamine color developing agent, such as the alkali solution recovered from the anion exchange resin, as well as the concentrated or diluted alkali solutions collected by electrodialysis.

More specifically, the present invention may be applied to treat aqueous solutions of sulfuric acid, sodium chloride and carbonic acid used to desorb a small amount of color developing agent from an anion exchange resin to which a color developer has been brought into contact so as to remove halogen ions (see U.S. Pat. No. 3,253,920). Solutions that can also be treated by the present invention are aqueous acid solutions that are obtained as the final product in the recovery of the color developing agent as shown in Japanese Patent Applications (OPI) Nos. 82235/77 and 50737/78 and U.S. Pat. No. 2,358,053.

Preferred embodiments of the present invention are hereunder described by reference to the accompanying drawing FIGS. 1 and 2, but it should be understood that the scope of the present invention is by no means limited to these embodiments.

FIG. 1 shows schematically one embodiment of the apparatus of the present invention which includes a tank 1 above which is positioned a pipe 2 for supplying into said tank a waste photographic processing solution containing the p-phenylenediamine color developing agent. Adjacent to this pipe 2 is positioned a pipe 3 for supplying into the tank 1 the necessary amount of water to dilute the processing solution to a predetermined salt concentration. The apparatus of FIG. 1 also includes a tank 4 for adjusting the pH of the processing solution in the tank 1 to a value not higher than 8.0. This tank 4 is connected to one end of a pipe 5 for supplying a pH adjusting liquor. The other end of the pipe 5 extends to a position above the tank 1. The tank 1 is equipped with a pH detector 6 that detects the pH of the processing solution in the tank 1. The detected pH value is read by a pH meter 7 and depending upon this value, a value 22 on the pipe 5 is closed or opened to regulate the supply of the pH adjusting liquor to the tank 1. The tank 1 is equipped with a stirrer 8 that ensures uniform mixing of the processing solution, water and pH adjusting liquor in the tank 1.

The apparatus of FIG. 1 further includes a resin column 9 filled with a cation exchange resin 10. The tank 1 is connected to the resin column 9 by a pipe 11 which is fitted with a valve 12 and a pump 28. The resin column 9 is also connected to one end of a pipe 13 for recovering the processing solution from which the p-phenylenediamine color developing agent has been removed by contact with the cation exchange resin. The other end of the pipe 13 extends to a recovery tank (not shown). The pipe 13 is fitted with a valve 14 for regulating the flow of the processing solution from the resin column 9.

Figure 2:
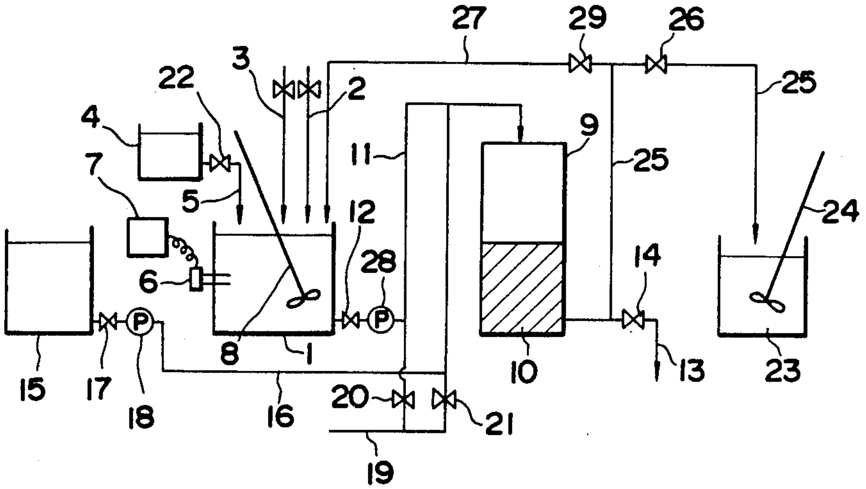
FIG. 2 is a schematic presentation of another embodiment of the apparatus of the present invention used to recover the p-phenylenediamine color developing agent and to recycle the same as a component of the color developer.

FIG. 2 shows schematically another embodiment of the apparatus of the present invention used to recover the p-phenylenediamine color developing agent and to recycle the same as a component of the color developer. The parts of the apparatus which are the same as those shown in FIG. 1 are identified by like numerals and their explanation is omitted. The apparatus of FIG. 2 includes a tank 15 for accommodating an alkali solution having a pH of not lower than 9.0 which is supplied to the resin column 9 in order to desorb the p-phenylenediamine color developing agent from the cation exchange resin 10. The tank 15 is connected to one end of a pipe 16, and the other end of this pipe extends to a position above the resin column 9. The pipe 16 is fitted with a valve 17 and a pump 18. Pipe 19 is connected to the pipes 11 and 16 in order to supply water for purging the interior of these two pipes and the resin column 9. The pipe 19 is fitted with valves 20 and 21.

The apparatus of FIG. 2 also includes a recovery tank 23 positioned downstream the resin column 9. This recovery tank is equipped with a stirrer 24. A pipe 25 communicates with the resin column 9 at one end which is connected to the pipe 13 at a position upstream the valve 14. The other end of the pipe 25 extends through a valve 26 to a position above the recovery tank 23. A pipe 27 is connected at one end to the pipe 25 at a position upstream the valve 26. The pipe 27 has a valve 29 at a position upstream the junction with the pipe 25 and the other end of that pipe 27 extends to a position above the tank 1.

The process of recovering the p-phenylenediamine color developing agent with the apparatus of FIG. 1 proceeds as follows.

A waste photographic processing solution containing a p-phenylenediamine color developing agent discharged from an automatic processor is fed into the tank 1 through pipe 2. This waste processing solution contains all waste liquors coming out of the color developer, bleaching bath, fixing bath, water rinsing bath and other baths used in the photographic processing. If the waste processing solution in the tank 1 has a salt concentration higher than 0.3 mol/1,000 ml, water is supplied through the pipe 3 so as to dilute said solution to a salt concentration lower than that level. If the pH of the processing solution as read by the pH meter 7 is higher than 8.0, the pH adjusting liquor is supplied from the tank 4 through the pipe 5 so as to decrease the pH of the processing solution to a level lower than 8.0. While the water and pH adjusting liquor are supplied into the tank 1, the stirrer 8 is in action to mix them uniformly with the processing solution. While the valve 12 is open, the processing solution that has been adjusted to the predetermined levels of salt concentration and pH is forced through the pipe 11 with the pump 28 and fed to the top of the resin column 9. The processing solution descends the resin column 9 while it is in contact with the cation exchange resin 10. As a result, the p-phenylenediamine color developing agent in the processing solution is adsorbed on the cation exchange resin 10. The processing solution that has been substantially freed of the color developing agent is discharged from the resin column 9 through the valve 14 and pipe 13. If the capacity of the cation exchange resin having the p-phenylenediamine color developing agent adsorbed thereto is saturated, it may be removed from the column 9 for incineration. Alternatively, the resin may be regenerated by the apparatus shown in FIG. 2.

The operation of the apparatus of FIG. 2 is the same as that of the operation of the apparatus shown in FIG. 1 so far as the separation of the p-phenylenediamine color developing agent from the waste photographic processing solution is concerned. Therefore, the following description is directed to the subsequent recovery of the color developing agent from the cation exchange resin.

First, the valve 12 is closed and the pump 28 is turned off when a predetermined amount of the processing solution has been passed through the resin column 9. Then, the valves 20 and 14 are opened, and water is supplied through the pipe 19 to purge the pipe 11 and resin column 9. The washings are discharged from the column 9 through the pipe 13. Throughout this purging step, the valves 26, 29, 17 and 21 remain closed and the pump 18 is off. After completion of the purging step, the valves 20 and 14 are closed whereas the valves 17 and 26 are opened. The pump 18 is turned on and the alkali solution with a pH of not lower than 9.0 is supplied from the tank 15 into the resin column 9 through the pipe 16. The alkali solution may be an unconditioned color developer free of the color developing agent or an overflow from the conditioned color developer. By contact with the alkali solution having a pH of not lower than 9.0, the p-phenylenediamine color developing agent is desorbed from the cation exchange resin 10 and recovered into the tank 23 through the pipe 25 together with the alkali eluent. When the elution of the p-phenylenediamine color developing agent from the cation exchange resin 10 is completed by passing a predetermined amount of the alkali solution, the valve 17 is closed and the pump 18 is turned off. Then, the valve 21 is opened and water is supplied into the resin column 9 through pipe 19, thereby purging the alkali solution from the resin 10. The washings are recovered into the tank 23 through the valve 26 and pipe 25. The p-phenylenediamine color developing agent in the tank 23 is supplemented with the necessary components of color developer and put to another use.

After completion of the purging step, the valves 21 and 26 are closed whereas the valves 20 and 29 are opened and the interior of the column 9 is thoroughly purged with water that is supplied through the pipe 19. The washings contain a small amount of p-phenylenediamine color developing agent and are returned to the tank 1 through the pipe 25, valve 29 and pipe 27 for further treatment.

The cation exchange resin 10 packed in the column 9 includes the cation exchange resins mentioned above.

The resin column 9 may be of any type that is known well and has been conventionally used to treat wastewaters with ion exchange resins on an industrial scale.

In order to selectively separate and recover the p-phenylenediamine color developing agent from the photographic processing solution by contact with the cation exchange resin, the processing solution must have a pH of not higher than 8.0. Therefore, a photographic processing solution having a pH of 10.0 or more must be brought into contact with the cation exchange resin after the pH of the processing solution is adjusted to 8.0 or lower with the pH adjusting liquor supplied from the tank 4.

The pH adjusting liquor used to adjust the pH of the waste photographic processing solution to 8.0 or lower is accommodated in the tank 4.

For practical purposes, the best mode of embodiment of the apparatus of the present invention is to recover the p-phenylenediamine color developing agent from the cation exchange resin by using as the alkali eluent an unconditioned color developer free of the color developing agent or an overflow of the conditioned color developer.

According to the apparatus of the present invention, the p-phenylenediamine color developing agent in the waste photographic processing solution can be separated selectively in preference to other cations (e.g. $Na^+$ and $K^+$) in the processing solution with the aid of the cation exchange resin. Furthermore, the p-phenylenediamine color developing agent can be easily desorbed from the cation exchange resin by elution with the alkali solution having a pH of not less than 9.0, and the desorbed developing agent can be put to another service as a component of the color developer.

The present invention is hereunder described in greater detail by reference to the following working examples to which the scope of the invention is by no means limited.

EXAMPLE 1

Twelve samples of a color developer having the components listed below and a salt concentration of about 0.3 ml per liter were prepared. They were subsequently diluted to the salt concentrations shown in Table 1 and adjusted to the pHs also shown in Table 1. The so adjusted samples were fed from the top of cation exchange resin columns at a flow rate of 8 ml/min. The columns were charged with 20 ml each of the cation exchange resins shown in Table 1. The ability of the respective resins to adsorb the p-phenylenediamine color developing agent is shown in Table 1 in grams per liter of the resin. Five comparative samples were prepared as shown in Table 1, two of which were treated with Amberlite XAD-7 and Amberlite IRA-400 respectively which were outside the scope of the cation exchange resin for use in the present invention.

The results are also shown in Table 1.

| Formulation of the color developer: Components | Amounts (in 1,000 ml) |
|---|---|
| Potassium carbonate | 30 g |
| Sodium hydrogencarbonate | 2.5 g |
| Potassium sulfite | 5 g |
| Sodium bromide | 1.2 g |
| Potassium iodide | 1.5 mg |
| Hydroxylamine sulfate | 2.5 g |

-continued

| Formulation of the color developer: Components | Amounts (in 1,000 ml) |
|---|---|
| Sodium chloride | 0.3 g |
| Sodium diethylenetriaminepentaacetate | 2.5 g |
| 4-Amino-3-methyl-N—ethyl-N—(β-hydroxy-ethyl)aniline sulfate (CD-4) | 4.6 g |
| pH | 10.06 |

TABLE 1

Adsorptivity of Ion Exchange Resins

| No. | Color developer: Salt concentration (mol/1,000 ml) | Color developer: pH | Ion exchange resins: Trade name | Ion exchange resins: Functional group | Ion exchange resins: Resin matrix | Adsorptivity (g/1,000 ml resin) | |
|---|---|---|---|---|---|---|---|
| 1 | 0.03 | 2.7 | Amberlite IR-120 | $—SO_3H$ | Styrene-divinylbenzene copolymer, gel type strong acid cation exchange resin | 60 | Samples of the present invention |
| 2 | 0.03 | 2.7 | Diaion SKIB | $—SO_3H$ | Styrene-divinylbenzene copolymer, gel type strong acid cation exchange resin | 60 | |
| 3 | 0.03 | 2.7 | Duolite C-26 | $—SO_3H$ | Styrene-divinylbenzene copolymer, macroporous type strong acid cation exchange resin | 70 | |
| 4 | 0.03 | 5.0 | Amberlite IRC-50 | —COOH | Acrylic acid-divinyl-benzene copolymer, weak acid cation exchange resin | 35 | |
| 5 | 0.03 | 2.7 | Duolite ES-63 | $—PO_3H_3$ | Styrene-divinylbenzene copolymer, macroporous type strong acid cation exchange resin | 50 | |
| 6 | 0.3 | 2.7 | Duolite C-26 | $—SO_3H$ | Styrene-divinylbenzene copolymer, macroporous type strong acid cation exchange resin | 35 | |
| 7 | 0.06 | 2.7 | Duolite C-26 | $—SO_3H$ | Styrene-divinylbenzene copolymer, macroporous type strong acid cation exchange resin | 40 | |
| 8 | 0.03 | 2.7 | Duolite C-26 | $—SO_3H$ | Styrene-divinylbenzene copolymer, macroporous type strong acid cation exchange resin | 70 | |
| 9 | 0.02 | 2.7 | Duolite C-26 | $—SO_3H$ | Styrene-divinylbenzene copolymer, macroporous type strong acid cation exchange resin | 100 | |
| 10 | 0.3 | 10.2 | Amberlite XAD-7 | — | Methacrylate esterglycol dimethacrylate copolymer | 30 | Samples outside the scope of the present invention |
| 11 | 0.3 | 10.2 | Amberlite IRA-400 | $—N^+(CH_3)_3Cl^-$ | Gel type strong base anion exchange resin | 4 | |
| 12 | 0.03 | 2.7 | Duolite C-3 | $—CH_2SO_3H$ | Phenol-formalin resin, macroporous type, strong acid cation exchange resin | 80 | Sample according to the present invention |
| 13 | 0.3 | 10 | Duolite C-26 | $—SO_3H$ | Styrene-divinylbenzene copolymer, macroporous type strong acid cation exchange resin | 0 | Samples outside the scope of the present invention |
| 14 | 0.03 | 10 | Duolite C-26 | $—SO_3H$ | Styrene-divinylbenzene copolymer, macroporous type strong acid cation exchange resin | 0 | |
| 15 | 0.03 | 10 | Duolite C-26 | $—SO_3H$ | Styrene-divinylbenzene copolymer, macroporous type strong acid cation exchange resin | 0 | |
| 16 | 0.02 | 8 | Duolite C-26 | $—SO_3H$ | Styrene-divinylbenzene copolymer, macroporous type strong acid cation exchange resin | 40 | Samples according to the present invention |
| 17 | 0.02 | 5 | Duolite-26 | $—SO_3H$ | Styrene-divinylbenzene copolymer, macroporous type strong acid cation | 45 | |

TABLE 1-continued

Adsorptivity of Ion Exchange Resins

| No. | Color developer: Salt concentration (mol/1,000 ml) | pH | Ion exchange resins: Trade name | Functional group | Resin matrix | Adsorptivity (g/1,000 ml resin) |
|---|---|---|---|---|---|---|
| | | | | | exchange resin | |

Table 1 shows that the p-phenylenediamine color developing agent contained in the color developers having pHs not higher than 8 could be adsorbed in significant amounts onto the cation exchange resins.

EXAMPLE 2

The color developing agent (CD-4) adsorbed onto Duolite C-26 (macroporous, strong acid cation exchange resin) in Example 1 was eluted with the alkali agents shown in Table 2 which were fed down through the columns at a flow rate of 4 ml/min. The elution efficiency of the respective alkali agents is shown in Table 2.

TABLE 2

Percent recovery of CD-4 by various alkali agents

| No. | Alkali agent | Concentration (g/1,000 ml) | pH | Percent recovery | Remarks |
|---|---|---|---|---|---|
| 1 | NaCl | 100 | 7 | 50 | Comparative samples |
| 2 | NaCl | 100 | 1* | 1 | |
| 3 | $K_2CO_3$ | 30 | 8 | 60 | |
| 4 | $K_2CO_3$ | 30 | 9 | 85 | Samples of the present invention |
| 5 | $K_2CO_3$ | 30 | 10 | 95 | |
| 6 | $K_2SO_3$ | 5 | 10 | 96 | |
| 7 | $K_2CO_3$<br>$K_2SO_3$ | 30<br>5 | 10 | 96 | |
| 8 | The color developer used in Example 1 | | 10.06 | 95 | |

*The pH of the alkali agents was adjusted by sulfuric acid or caustic soda.

REFERENCE EXAMPLE

Rolls of 135-size Sakura color negative film (product of Konishiroku Photo Industry Co., Ltd.) were continuously processed according to the following schedule in a Model NCV-36 automatic processor (product of Noritsu Koki K.K.).

| Processing steps | Temperature (°C.) | Period |
|---|---|---|
| Color development | 38 | 3 min and 15 sec |
| Bleaching | 38 | 4 min and 20 sec |
| Water rinsing | 38 | 1 min and 5 sec |
| Fixing | 38 | 4 min and 20 sec |
| Water rinsing | 38 | 3 min and 15 sec |
| Stabilization | 38 | 1 min and 5 sec |
| Drying | 38 | 2 min and 30 sec |

In the color development, a color developer having the same formulation as used in Example 1 was employed in combination with a replenisher having the formulation indicated below.

Replenisher:

| Components | Amounts (in 1,000 ml) |
|---|---|
| Potassium carbonate | 32.0 g |
| Sodium sulfite | 4.5 g |
| Potassium bromide | 0.9 g |
| Hydroxylamine sulfate | 3.2 g |

-continued

Replenisher:

| Components | Amounts (in 1,000 ml) |
|---|---|
| Color developing agent (CD-4) | 5.6 g |

This replenisher was supplied in an amount of 50 ml per meter of the color negative film until a total length of 1,000 m was processed. As a result of this processing, 47 liters of the color developer overflowed into the stock tank. The composition of this overflow is indicated below. In order to remove bromide ions ($Br^-$), forth liters of the overflow were fed down through an anion exchange resin column at a flow rate of 0.2 liter/min. The column was filled with 2 liters of Amberlite IRA-400 (strong base anion exchange resin produced by Rohm and Haas Company; exchange group: $-N^+(CH_3)_3Cl^-$). The composition of the overflow that had passed through the anion exchange resin column is also indicated below.

| | Overflow in the stock tank (in 1,000 ml) | Effluent from anion exchange resin column (in 1,000 ml) |
|---|---|---|
| Potassium carbonate | 30.5 g | 27.3 g |
| Sodium sulfite | 3.7 g | 3.2 g |
| Potassium bromide | 1.35 g | 0.7 g |
| Hydroxylamine sulfate | 2.5 g | 2.15 g |
| Color developing agent (CD-4) | 5.0 g | 4.6 g |

The overflow free of the bromide ions was supplemented with the purified color developing agent and other necessary photographic additives so as to make 50 liters of a regenerated replenisher (1) having the same composition and concentration as those of the initial replenisher. Another 1000 m of 135-size color negative film roll was processed using this regenerated replenisher (1). Fifty cycles of this processing were performed, with the result that 7 liters of an overflow from the color developing tank were discarded for each cycle.

EXAMPLE 3

In this example, the color developing agent was effectively recovered from the overflow of the color developer that was discarded in the Reference Example. The color developing agent was also recovered from the color developer by the combination of a conventional anion exchange resin and the cation exchange resin according to the present invention. Both of the recovered developing agents were put to another use as a component of the color developer.

Seven liters of the overflow color developer discarded at each cycle in the Reference Example was diluted with water to a concentration one tenth of the initial value and its pH was adjusted to 2.7. Thereafter, the diluted overflow was fed down through a cation exchange resin column at a flow rate of 0.4 liter/min. The column was filled with 2 liters of Duolite C-26 which was a strong acid cation exchange resin included in the scope of the present invention. By this treatment, 34.0 g (>99%) of the color developing agent (CD-4) could be adsorbed onto Duolite C-26.

The overflow from the color developer was passed through a strong base anion exchange resin, Amberlite IRA-400, in order to remove bromide ions. The composition of the resulting effluent is shown in Table 3. Forty liters of this effluent were fed down through the column of Duolite C-26, which had adsorbed the color developing agent, at a flow rate of 0.4 liter/min. By this treatment, the color developing agent (CD-4) was effectively recovered into the effluent. The composition of this effluent from the column of Duolite C-26 is shown in Table 3. Forty liters of the effluent were supplemented with the necessary amounts of the color developing agent and other additives to make 50 liters of a regenerated replenisher (2) having the same composition and concentration as those of the initial replenisher shown in Table 3.

Using this regenerated replenisher (2), fifty cycles of treatment were conducted, each cycle consisting of color development, removal of bromide ions from the overflow color developer, separation and recovery of the color developing agent, and preparation of a regenerated replenisher from the overflow color developer. According to the present invention, there was no loss in the color developing agent because all the color developing agent in the overflow from the color developer could be regenerated.

Therefore, as a result of the 50 cycles of treatment, about 1.6 kg of the color developing agent (CD-4) could be effectively recycled for another use as a component of the color developer.

TABLE 3

| | Regeneration of color developer by the method of the present invention | | | |
|---|---|---|---|---|
| | Replenisher (g) | Overflow into Stock tank (g) | Effluent from anion exchange resin (g) | Effluent from cation exchange resin (g) |
| Potassium carbonate | 32.0 | 30.4 | 27.4 | 27.1 |
| Sodium sulfite | 4.5 | 3.7 | 3.2 | 3.2 |
| Potassium bromide | 0.9 | 1.34 | 0.7 | 0.7 |
| Hydroxylamine sulfate | 3.2 | 2.6 | 2.2 | 2.1 |
| CD-4 | 5.6 | 4.9 | 4.6 | 5.41 |

In order to check the photographic characteristics (speed, gamma, and fog density) of color developer (1) regenerated by the conventional method and color developer (2) regenerated by the method of the present invention, they were used to color-develop Sakura color II negative film rolls (product of Konishiroku Photo Industry Co., Ltd.) that had been subjected to a step exposure to white light with a Model KS-7 sensitometer (product of Konishiroku Photo Industry Co., Ltd.). The transmission densities of the yellow (Y), magenta (M) and cyan (C) images obtained were measured with a Model PDA 60 photoelectric densitometer (product of Konishiroku Photo Industry Co., Ltd.).

The results are shown in Table 4.

TABLE 4

| | Photographic characteristics | | | | | |
|---|---|---|---|---|---|---|
| | Conventional method | | | Method of the present invention | | |
| | Y | M | C | Y | M | C |
| Speed* | 158 | 100 | 40 | 157 | 103 | 42 |
| Gamma | 0.74 | 0.64 | 0.67 | 0.73 | 0.64 | 0.66 |
| Fog | 0.60 | 0.43 | 0.15 | 0.60 | 0.42 | 0.15 |

*The speed is indicated in relative values, with the speed of the magenta image formed by the conventional method taken as 100.

As is clear from Table 4, the two regenerated color developers (1) and (2) had no substantial difference in the speed, gamma and fog density of the respective dye images. This shows that according to the method of the present invention, the color developing agent in the overflow of the color developer that has been discarded in the conventional processing can be recycled very easily without sacrificing any photographic characteristics. Therefore, the economy of the present invention is great.

EXAMPLE 4

In order to remove halide ions from the color developer, 40 liters of an overflow from that color developer containing 5.0 g/1,000 ml of the color developing agent (CD-4) were passed through Amberlite IRA-400. As a result, the amount of the color developing agent was decreased to 4.6 g/1,000 ml. This means a total of 16 g of the color developing agent was adsorbed on the anion exchange resin. The agent was desorbed by the following procedure: First, the anion exchange resin was rinsed with water, and then regenerated with 60 liters of a 2% aqueous sulfuric acid that was fed down through the resin at a rate of 0.6 liter/min. As a result, the color developing agent was desorbed at an efficiency of 97.5% together with halide ions. The aqueous sulfuric acid contained about 0.26 g per liter of CD-4. It was then fed through a column that was charged with Duolite C-26 (cation exchange resin according to the present invention) as in Example 3. Almost all the color developing agent could be adsorbed on Duolite C-26. The adsorbed developing agent could be readily desorbed by contact with the overflow of the color developer that had been passed through the anion exchange resin for removal of halide ions.

Sakura Chrome R-100 rolls (color reversal film manufactured by Konishiroku Photo Industry Co., Ltd.) were processed with a Model E-6080 automatic processor (product of Noritsu Koki K.K.) according to the following schedule. The compositions of the color developer and pre-bleaching solution used are also shown below.

| Color reversal process | | |
|---|---|---|
| Steps | Temperature (°C.) | Period |
| First development | 38 | 6 min |
| First rinsing with water | 38 | 2 min |
| Reversal fogging | 38 | 2 min |
| Color development | 38 | 6 min |
| Pre-bleaching | 38 | 2 min |
| Bleaching | 38 | 6 min |
| Fixing | 38 | 4 min |
| Final rinsing with water | 38 | 4 min |
| Stabilization | 38 | 30 sec |
| Drying | 50 | |

| Color developer: | |
|---|---|
| Components | Amounts |
| Sodium tripolyphosphate | 5.0 g |
| 1,8-Hydroxy-3,6-dithiaoctane | 2.0 g |
| Anhydrous sodium sulfite | 7.6 g |
| Tripotassium phosphate (trihydrate) | 36.0 g |
| Potassium bromide | 0.8 g |
| Potassium iodide (0.1%) | 28.0 ml |
| Sodium hydroxide | 2.0 g |
| 4-Amino-N—ethyl-N—(β-methanesulfonamidoethyl)-m-toluidine sesquisulfate monohydrate (CD-3) | 10.5 g |
| Citrazinic acid | 1.35 g |
| pH | 11.8 |

| Pre-bleaching solution: | |
|---|---|
| Components | Amounts |
| α-monothioglycerol | 0.5 ml |
| Sodium hydroxide | 3.0 g |
| Sodium sulfite | 10.0 g |
| Ethylenediaminetetraacetic acid | 8.0 g |
| pH | 6.0 |

A serimetric analysis showed that 0.7 g of the color developing agent (CD-3) in 1,000 ml of the color developer on the films was carried over into the pre-bleaching solution. The color developing agent was separated and recovered from 10 liters of the pre-bleaching solution (pH: 6.0) by passing the latter down through a cation exchange resin column at a flow rate of 0.2 liter/min. The column was charged with 1,000 ml of Amberlite IR-120 (gel type cation exchange resin; exchange ion: $-30_3{}^-H^+$). The effluent from the column was substantially free of the color developing agent. As in Example 3, 10 liters of an overflow from the color developer were first passed through a column of the conventional anion exchange resin so as to remove bromide ions. The effluent was then passed through a column of Amberlite IR-120 at a flow rate of 0.2 liter/min. As a result, a total of 6.9 g (98.5%) of the color developing agent could be recovered from the pre-bleaching solution and the overflow color developer.

EXAMPLE 5

Seven liters of a color developer discharged from an automatic processor of color negative films were introduced through pipe 2 into a hard polyvinyl chloride tank 1 (200 liters) equipped with a stirrer 8. The color developer contained 5.0 g of a p-phenylenediamine color developing agent per 1,000 ml. About 100 liters of water were supplied into tank 1 through pipe 3 so as to adjust the salt concentration to not more than 0.02 mol/liter. While the stirrer 8 was rotated at 100 rpm, about 0.3 liter of 50% sulfuric acid was fed through valve 22 into tank 1 from tank 4 so as to adjust the pH of the color developer to 2.7. Then, valve 12 was opened and the color developer was forced into resin column 9 with pump 28 at a flow rate of 0.4 liter per minute. The column was made of a hard polyvinyl chloride cylinder having a diameter of 100 mm and a capacity of 4 liters. It was charged with 2 liters of cation exchange resin 10 (Duolite C-26 produced by Diamond Shamrock Corporation). As a result of one passage of the color developer through the resin column 9, the content of the color developing agent was reduced from the initial 0.33 g/1,000 ml to less than 0.003 g/1,000 ml, which was equivalent to a recovery ratio of at least 99%. The capacity of the cation exchange resin 10 was saturated as a result of six passages of the color developer. The saturated resin was removed from the column 9 and incinerated.

EXAMPLE 6

Twenty liters of a color developer and forty liters of a stopping solution and water rinsing solution were fed into tank 1. The three solutions were all discharged from an automatic processor ECP-2 (product of Eastman Kodak Company for processing motion picture color prints). The color developer contained 2.9 g per liter of a color developing agent, 3-methyl-4-amino-N,N-diethylaniline hydrochloride (CD-2). The stopping solution contained 3.3 g per liter of CD-2, and the water rinsing solution contained 0.17 g per liter of CD-2. Water was supplied into the tank 1 through pipe 3 to dilute the mixture of waste processing solutions to a final volume of 800 liters. The diluted mixture contained about 0.16 g of CD-2 per liter. Then, valve 22 was opened and concentrated sulfuric acid was fed into tank 1 from tank 4 so as to adjust the pH of the mixture to between 2.5 and 2.7. Valves 12 and 14 were then opened and the mixture of processing solutions was forced into resin column 9 with pump 28 at a flow rate of 6 liters per minute. A total of 45 liters of Duolite C-26 was used as cation exchange resin 10. As a result of one passage through the resin column, the content of CD-2 was decreased from the initial 0.16 g per liter to 0.002 g per liter, which was equivalent to a recovery ratio of 98.7%. After repeating this operation 5 times, valve 20 was opened and pipe 11 and resin column 9 were purged with water supplied through pipe 19 at a flow rate of 10 liters per minute.

Subsequently, valves 20 and 14 were closed whereas valves 17 and 26 were opened and an alkali solution having a pH of 11 was forced into resin column 9 with pump 18 at a flow rate of 5 liters per minute. As this alkali solution, 50 liters of a concentrated color developer replenisher free of CD-2 were used, and after passing through the resin column 9, it was recovered into tank 23 through pipe 25. After turning off the pump 18 and closing valve 17, valve 21 was opened and water was fed into the resin column 9 at a flow rate of 10 liters per minute. The effluent from the resin column was mixed with the alkali solution in tank 23 to make the total volume 100 liters. The so treated alkali solution could be used as a replenisher for the color developer. It had a standard level of the CD-2 content (5.9 g/1,000 ml), and this was equivalent to an elution ratio (recovery ratio) of 93.3% of CD-2 initially adsorbed onto Duolite C-26.

Subsequently, valve 26 was closed and valve 29 opened for purging the resin column 9 with water being supplied through pipe 19. The washings contained a small amount of CD-2 and were recycled to tank 1 for further treatment.

What is claimed is:

1. A method of separating a p-phenylenediamine compound color developing agent from a solution at a pH of not higher than 8.0 by bringing said solution into contact with a cation exchange resin.

2. A method of recovering a p-phenylenediamine compound color developing agent from a solution at a pH of not higher than 8.0 by first bringing said solution into contact with a cation exchange resin and then bringing said cation exchange resin into contact with an alkali solution having a pH of not lower than 9.0.

* * * * *